May 22, 1962 H. KATT, JR 3,035,544
PAPERBOARD BOXES FOR ANIMALS
Filed May 15, 1959 2 Sheets-Sheet 1

Herbert Katt, Jr.
INVENTOR.

BY

May 22, 1962  H. KATT, JR  3,035,544
PAPERBOARD BOXES FOR ANIMALS
Filed May 15, 1959  2 Sheets-Sheet 2
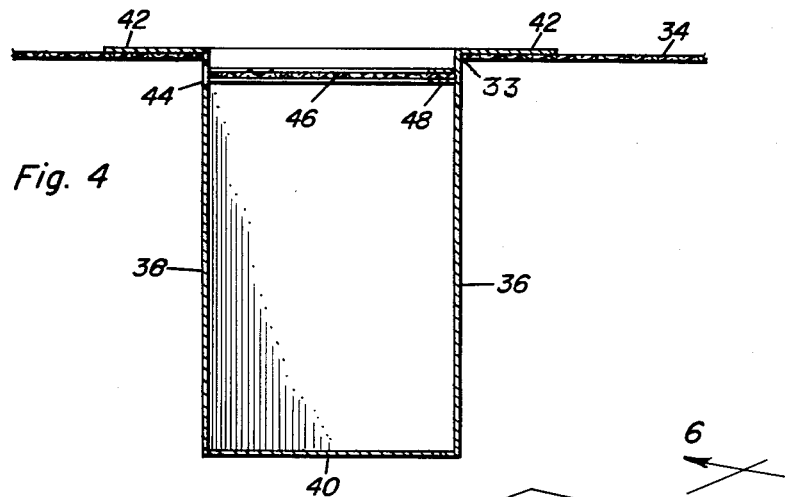
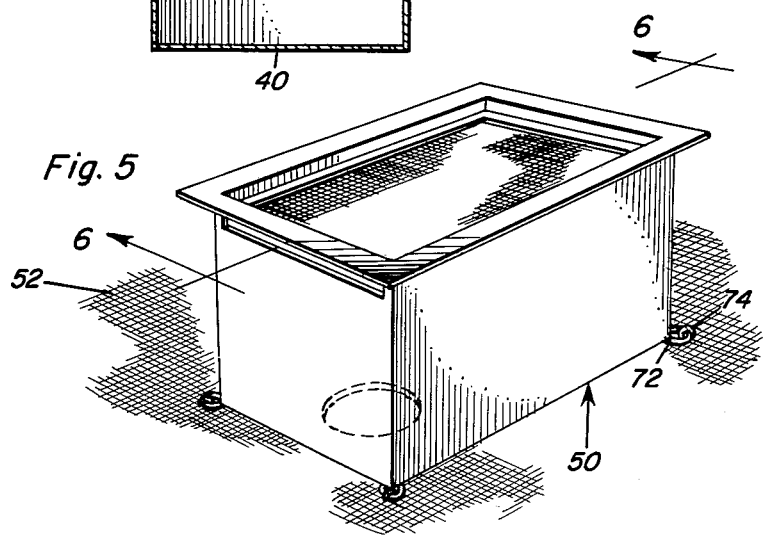
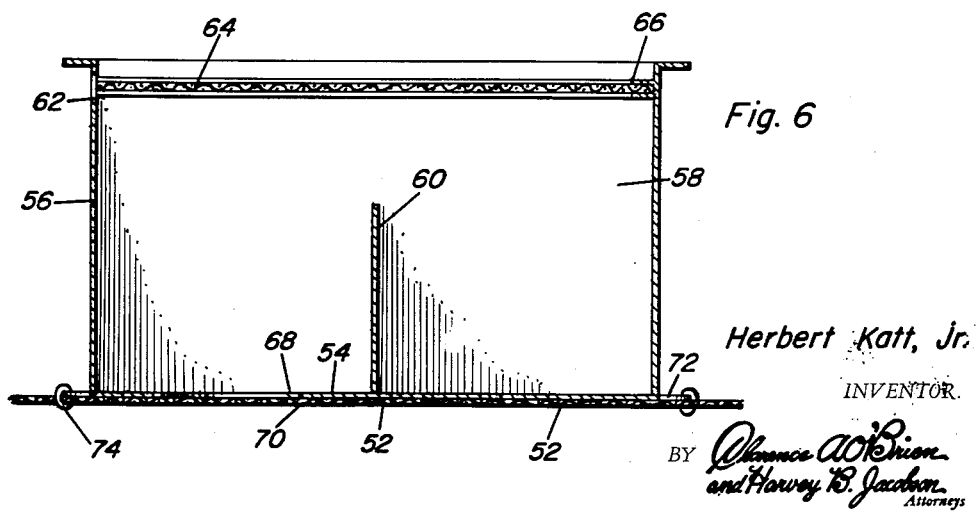
Herbert Katt, Jr.
INVENTOR.

United States Patent Office 3,035,544
Patented May 22, 1962

3,035,544
PAPERBOARD BOXES FOR ANIMALS
Herbert Katt, Jr., 2411 90th St., Sturtevant, Wis.
Filed May 15, 1959, Ser. No. 813,571
5 Claims. (Cl. 119—19)

The present invention generally relates to animal breeding and pelter boxes adapted to be mounted on animal pens or cages.

The primary object of the present invention is to provide a box construction and more particularly a disposable paperboard box adapted for mounting on an animal pen for use as a breeding box or pelter box in which the box has access to the interior of the pen and has a removable screen closure therefor for permitting access into the interior of the box from the exterior thereby providing access to the interior of the box by the animals from the pen and access to the interior of the box by persons exteriorly of the pen by removing the screen closure.

Another object of the invention is to provide a relatively inexpensive paperboard box construction which may be stored in collapsed or folded condition and which includes a sliding wire mesh cover and means mounting the box on the wall or top of a wire animal pen with the box having an opening therein communicating with the interior of the pen for access of animals into the interior of the box whereby the box may be used as a breeder box, pelter box or the like.

Another object of the present invention is to provide a box construction for use as a pelter box or breeder box of several forms in which the same may be mounted on the side wall of a wire animal pen, or on the top wall of such a pen.

A further object of the present invention is to provide a mass produced box of paper, paperboard or the like of proper size and shape to adapt them to mink farming with each box being provided with a grooved lip on the inner perimeter thereof for receiving a wire mesh cover with the box being disposable, sanitary and extremely inexpensive in manufacture thus making the disposable feature economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a longitudinal, vertical sectional view on an enlarged scale, taken substantially upon a plane passing along section line 4—4 of FIGURE 3 illustrating the structural details of this form of the invention;

FIGURE 5 is a perspective view of another modification to be used on the top wall of the pen when the pen is too shallow to receive the construction of FIGURE 3; and FIGURE 6 is a longitudinal, vertical sectional view on an enlarged scale, taken substantially upon a plane passing along section line 6—6 of FIGURE 5 illustrating the structural details of this form of the invention.

Figure 1:
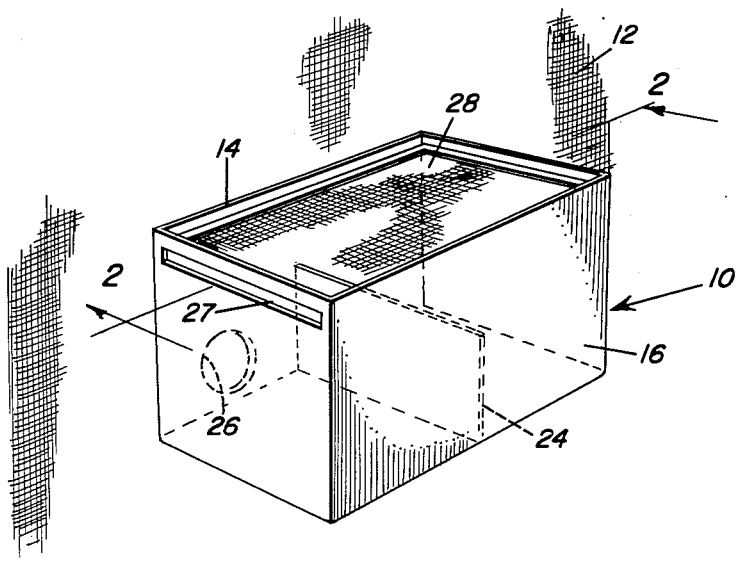
FIGURE 1 is a perspective view of a breeder box mounted on the outside of a vertical wall of an animal pen.
Figure 2:
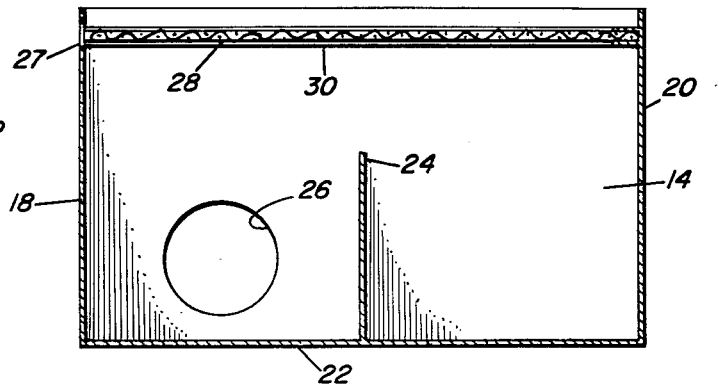
FIGURE 2 is a longitudinal, vertical sectional view on an enlarged scale, taken substantially upon a plane passing along section line 2—2 of FIGURE 1 illustrating the interior structural details of the box.

Referring now specifically to FIGURES 1 and 2 of the drawings, the numeral 10 generally designates the breeder box which is mounted on the vertical side or peripheral wall or member 12 of wire mesh material of an animal pen such as a mink pen. The box 10 may be mounted in any suitable manner and is provided with two elongated side walls 14 and 16, end walls 18 and 20, a bottom wall 22 and a partition wall 24 extending intermediate of the end walls 18 and 20 and vertically from the bottom wall 22 with the upper edge thereof terminating slightly above the center of the vertical height of the box 10. The wall 14 is provided with a circular opening 26 therein which communicates the interior of the box 10 through the screen mesh wall 12 into the interior of the animal pen.

The end wall 18 is provided with a transverse slot 27 for receiving a wire mesh cover 28 slidable in grooves 30 formed on the walls 14, 16 and 20 for receiving and holding the wire mesh cover whereby the wire mesh cover 28 may be moved longitudinally for removing or partially removing the same thereby providing access to the interior of the box 10.

Figure 3:
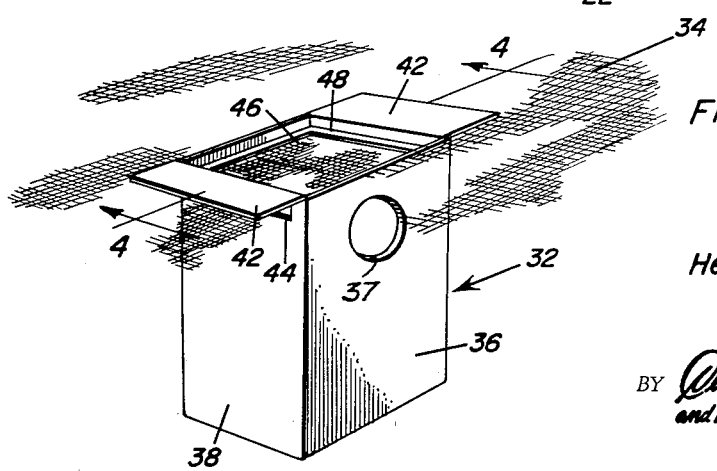
FIGURE 3 is a perspective view of a modified form of the invention, showing same mounted in recessed relation in the top wall of an animal pen.

FIGURES 3 and 4 illustrate another form of the invention generally designated by the numeral 32 which includes a vertically elongated polygonal box adapted to be mounted in recessed relation in a polygonal opening 33 which is provided therefor in the top wall 34 of the animal pen with the box containing side walls 36, end walls 38, a bottom 40, and outwardly extending end flanges 42 which rest upon and supportingly engage the wire 34. One end wall 38 is provided with a slot-like opening 44 for receiving a wire mesh cover 46 received between spaced guides 48. The wall 36 is provided in its upper portion with a circular opening 37 for the passage of the animals.

FIGURES 5 and 6 illustrate another modified form of the invention generally designated by the numeral 50 with the box being mounted on the top surface of the wire mesh top wall 52 with the box 50 including a bottom 54, end walls 56, side walls 58 and an upstanding partition 60 which partition is similar to the partition in the form of the invention shown in FIGURES 1 and 2. The end wall 56 is provided with an opening 62 for receiving a wire mesh cover 64 received between flanges or guides 66 for retaining the screen mesh cover 64 in position. Also, the bottom 54 is provided with an opening 68 for alignment with an opening 70 in the wire mesh top 52. Each corner of the box 50 is provided with projecting lugs 72 which are apertured and which are used for anchoring the box 50 to the top wall 52 as by anchor ties 74 shown in the drawings.

With the present invention, mink farming may be greatly simplified in that the use of the present invention as a breeder box and a pelter box enables easy portability of the boxes with there being a possibility of shaping the boxes for their particular use.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with an animal pen having a peripheral member with an opening therein, a disposable, open top box of paperboard material including opposed vertical walls, means supporting the box solely from the peripheral member in closing relation to the opening, said box having an opening therein for communicating the interior of the pen with the interior of the box, and a movable closure member for the box slidable on said opposed, vertical walls for providing access into the interior of the box from the exterior of the pen.

2. The structure as defined in claim 1 wherein said closure member is in the form of a wire mesh screen top, guideways on said opposed vertical walls for slidably receiving opposed edges of the top for retaining the top in closed position.

3. In combination with an animal pen of wire mesh material including a top wall having an enlarged opening therein, a disposable paperboard box telescopically received within the opening in the top wall of the pen, said box including laterally extending flange means on the upper end thereof resting against the top surface of the top wall of the pen thus supporting the box from the top wall, a movable closure for the top of the box, said closure being accessible and operable from the exterior of the pen, and means forming a support for the closure in the open-end area of the box, one wall of the box having an opening therein disposed below the top wall of the pen thereby enabling animals in the pen to have access to the interior of the box, said opening being spaced above the bottom of the box and located adjacent the top wall of the pen.

4. The structure as defined in claim 3 wherein said means for supporting the closure includes horizontally disposed guide means, said closure being slidably received in the guide means and being constructed of mesh material for observation of the interior of the box from the top of the animal pen, and a slot in said box for enabling sliding movement of the closure.

5. In combination with an animal pen including a wire mesh top wall having a polygonal opening therein, a removable and disposable, open top paperboard breeder box of polygonal horizontal section suspended in the pen from the top wall through said opening, said box including a bottom, opposed end walls and opposed side walls, outwardly extending horizontal flanges integral with the upper edges of said end walls resting on said top wall for suspending the box therefrom, pairs of horizontal guide flanges on said side walls defining grooves adjacent to but spaced below the top of the box, one of said end walls having a horizontal slot therein spaced from the top thereof and communicating with the grooves, and a foraminous closure for the box slidable in the grooves and openable in the slot below the top wall of the pen, one of said side walls having an animal access opening in its upper portion communicating with the pen.

References Cited in the file of this patent
UNITED STATES PATENTS

| | | |
|---|---|---|
| 1,737,073 | Boldt | Nov. 26, 1929 |
| 2,002,259 | Cole | May 21, 1935 |
| 2,467,525 | Fricke | Apr. 19, 1949 |
| 2,759,622 | Simmons et al. | Aug. 21, 1956 |